United States Patent
Hegde

(12) 
(10) Patent No.: US 11,119,921 B1
(45) Date of Patent: Sep. 14, 2021

(54) STATE MACHINE GENERATION FOR MULTI-BUFFER ELECTRONIC SYSTEMS

(71) Applicant: Xilinx, Inc., San Jose, CA (US)

(72) Inventor: Uday M. Hegde, Acton, MA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/001,252

(22) Filed: Aug. 24, 2020

(51) Int. Cl.
  *G06F 12/0806* (2016.01)
(52) U.S. Cl.
  CPC .. *G06F 12/0806* (2013.01); *G06F 2212/1008* (2013.01)
(58) Field of Classification Search
  CPC .................................................. G06F 12/0806
  USPC ......................................................... 711/119
  See application file for complete search history.

(56) References Cited

U.S. PATENT DOCUMENTS

| | | | | |
|---|---|---|---|---|
| 4,467,411 A | * | 8/1984 | Fry ......................... | G06F 3/061 711/136 |
| 2003/0147409 A1 | * | 8/2003 | Wolrich .................. | H04L 49/90 370/412 |

\* cited by examiner

*Primary Examiner* — Jae U Yu
(74) *Attorney, Agent, or Firm* — Kevin T. Cuenot

(57) ABSTRACT

State machine generation for a multi-buffer electronic system can include receiving, using a processor, a user input specifying a reader policy and a number of a plurality of buffers used by a reader and a writer of the multi-buffer electronic system. A state machine can be generated as a data structure. The state machine has a plurality of states determined based on the number of the plurality of buffers and the reader policy. The state machine allocates different buffers of the plurality of buffers to the reader in temporally accurate order over time. Each state can specify an allocation from the plurality of buffers to the reader and the writer. A state machine description including one or more program code components can be generated, where the one or more program components may be used in an implementation of the reader and an implementation of the writer.

20 Claims, 13 Drawing Sheets

```
#ifdef __KERNEL__
#include <linux/types.h>
#else
#include <stdint.h>
#endif

/* genstates/NumBufs:3 READER_POLICY_NEWEST SeedWriterBuf:0/NumStates=16 */ uint8_t genstates_writer(uint8_t* pState)
{
        switch(*pState) {
        default: *pState = 0; return 0;
        case 0: *pState = 1; return 1;
        case 1: *pState = 2; return 2;
        case 2: *pState = 3; return 0;
        case 3: *pState = 1; return 1;
        case 4: *pState = 5; return 1;
        case 5: *pState = 6; return 0;
        case 6: *pState = 5; return 1;
        case 7: *pState = 8; return 2;
        case 8: *pState = 9; return 0;
        case 9: *pState = 8; return 2;
        case 10: *pState = 11; return 1;
        case 11: *pState = 12; return 2;
        case 12: *pState = 11; return 1;
        case 13: *pState = 9; return 0;
        case 14: *pState = 6; return 0;
        case 15: *pState = 12; return 2;
        }
}
```

FIG. 6

```
#ifdef __KERNEL__
#include <linux/types.h>
#else
#include <stdint.h>
#endif

/* genstates/NumBufs:3 READER_POLICY_NEWEST SeedWriterBuf:0/NumStates=16 */ uint8_t genstates_reader(uint8_t* pState)
{
        switch(*pState) {
        default: *pState = 0; return 3;
        case 0: *pState = 0; return 3;
        case 1: *pState = 15; return 0;
        case 2: *pState = 13; return 1;
        case 3: *pState = 4; return 2;
        case 4: *pState = 4; return 2;
        case 5: *pState = 15; return 0;
        case 6: *pState = 7; return 1;
        case 7: *pState = 7; return 1;
        case 8: *pState = 10; return 0;
        case 9: *pState = 4; return 2;
        case 10: *pState = 10; return 0;
        case 11: *pState = 14; return 2;
        case 12: *pState = 13; return 1;
        case 13: *pState = 13; return 1;
        case 14: *pState = 14; return 2;
        case 15: *pState = 15; return 0;
        }
}
```

FIG. 7

```
// genstates/NumBufs:3 READER_POLICY_NEWEST SeedWriterBuf:0/NumStates=16 case genstates_state
default: begin
        genstates_state <= 4'b0000;
        genstates_wbuf <= 2'b00;
        end
4'b0000: begin
        genstates_state <= 4'b0001;
        genstates_wbuf <= 2'b01;
        end
4'b0001: begin
        genstates_state <= 4'b0010;
        genstates_wbuf <= 2'b10;
        end
4'b0010: begin
        genstates_state <= 4'b0011;
        genstates_wbuf <= 2'b00;
        end
4'b0011: begin
        genstates_state <= 4'b0001;
        genstates_wbuf <= 2'b01;
        end
4'b0100: begin
        genstates_state <= 4'b0101;
        genstates_wbuf <= 2'b01;
        end
4'b0101: begin
        genstates_state <= 4'b0110;
        genstates_wbuf <= 2'b00;
        end
4'b0110: begin
        genstates_state <= 4'b0101;
        genstates_wbuf <= 2'b01;
        end
4'b0111: begin
        genstates_state <= 4'b1000;
        genstates_wbuf <= 2'b10;
        end
```

FIG. 8A

```
4'b1000: begin
        genstates_state <= 4'b1001;
        genstates_wbuf <= 2'b00;
        end
4'b1001: begin
        genstates_state <= 4'b1000;
        genstates_wbuf <= 2'b10;
        end
4'b1010: begin
        genstates_state <= 4'b1011;
        genstates_wbuf <= 2'b01;
        end
4'b1011: begin
        genstates_state <= 4'b1100;
        genstates_wbuf <= 2'b10;
        end
4'b1100: begin
        genstates_state <= 4'b1011;
        genstates_wbuf <= 2'b01;
        end
4'b1101: begin
        genstates_state <= 4'b1001;
        genstates_wbuf <= 2'b00;
        end
4'b1110: begin
        genstates_state <= 4'b0110;
        genstates_wbuf <= 2'b00;
        end
4'b1111: begin
        genstates_state <= 4'b1100;
        genstates_wbuf <= 2'b10;
        end
endcase
```

FIG. 8B

```
// genstates/NumBufs:3 READER_POLICY_NEWEST SeedWriterBuf:0/NumStates=16 case genstates_state
default: begin
        genstates_state <= 4'b0000;
        genstates_rbuf <= 2'b11;
        genstates_rrdy <= 1'b0;
    end
4'b0000: begin
        genstates_state <= 4'b0000;
        genstates_rbuf <= 2'b11;
        genstates_rrdy <= 1'b0;
    end
4'b0001: begin
        genstates_state <= 4'b1111;
        genstates_rbuf <= 2'b00;
        genstates_rrdy <= 1'b1;
    end
4'b0010: begin
        genstates_state <= 4'b1101;
        genstates_rbuf <= 2'b01;
        genstates_rrdy <= 1'b1;
    end
4'b0011: begin
        genstates_state <= 4'b0100;
        genstates_rbuf <= 2'b10;
        genstates_rrdy <= 1'b1;
    end
4'b0100: begin
        genstates_state <= 4'b0100;
        genstates_rbuf <= 2'b10;
        genstates_rrdy <= 1'b1;
    end
4'b0101: begin
        genstates_state <= 4'b1111;
        genstates_rbuf <= 2'b00;
        genstates_rrdy <= 1'b1;
    end
4'b0110: begin
        genstates_state <= 4'b0111;
        genstates_rbuf <= 2'b01;
        genstates_rrdy <= 1'b1;
    end
```

FIG. 9A

```
4'b0111: begin
        genstates_state <= 4'b0111;
        genstates_rbuf <= 2'b01;
        genstates_rrdy <= 1'b1;
        end
4'b1000: begin
        genstates_state <= 4'b1010;
        genstates_rbuf <= 2'b00;
        genstates_rrdy <= 1'b1;
        end
4'b1001: begin
        genstates_state <= 4'b0100;
        genstates_rbuf <= 2'b10;
        genstates_rrdy <= 1'b1;
        end
4'b1010: begin
        genstates_state <= 4'b1010;
        genstates_rbuf <= 2'b00;
        genstates_rrdy <= 1'b1;
        end
4'b1011: begin
        genstates_state <= 4'b1110;
        genstates_rbuf <= 2'b10;
        genstates_rrdy <= 1'b1;
        end
4'b1100: begin
        genstates_state <= 4'b1101;
        genstates_rbuf <= 2'b01;
        genstates_rrdy <= 1'b1;
        end
4'b1101: begin
        genstates_state <= 4'b1101;
        genstates_rbuf <= 2'b01;
        genstates_rrdy <= 1'b1;
        end
4'b1110: begin
        genstates_state <= 4'b1110;
        genstates_rbuf <= 2'b10;
        genstates_rrdy <= 1'b1;
        end
4'b1111: begin
        genstates_state <= 4'b1111;
        genstates_rbuf <= 2'b00;
        genstates_rrdy <= 1'b1;
        end
endcase
```

FIG. 9B

```
// genstates/NumBufs:3 READER_POLICY_NEWEST SeedWriterBuf:0/NumStates=16

`define genstates_NUM_STATES_BITS 4
`define genstates_NUM_STATES_BITS_MASK 15
`define genstates_BUF_BITS 2
`define genstates_BUF_BITS_MASK 3
```

FIG. 10

STATE MACHINE GENERATION FOR MULTI-BUFFER ELECTRONIC SYSTEMS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to electronic systems and, more particularly, to automatically generating a state machine for an electronic system that uses multiple buffers.

BACKGROUND

Many electronic systems utilize multiple buffers to convey data between a data generating circuit referred to as a "writer" and a data consuming circuit referred to as a "reader." The reader and the writer operate concurrently using the buffers to pass data from the writer to the reader. Using multiple buffers smooths out data transfers between the writer and the reader.

A video system is one example of an electronic system that uses multiple buffers. A video system may include one or more cameras that function as writers and one or more computers or other image and/or video processors functioning as readers. Smoothing access between the readers and the writers in a video system may result in the reduction and/or elimination of certain visual artifacts such as video tearing.

One goal of many electronic systems is to provide multiple buffers for use by reader(s) and writer(s) while also preserving temporal order of the data being processed. That is, the reader should consume data from the buffers in a temporally accurate manner that corresponds to the order in which the writer writes the data to the buffers. In some cases, where a short-term data rate mismatch occurs, the reader and/or writer may reuse the same data. Referring to the video system example, the reader and/or the writer may reuse the same frame. In other cases, data may be dropped.

Readers and writers obtain buffers by issuing requests for a buffer. The requests are typically serviced using indices into a ring buffer or linked lists. These approaches often suffer from several disadvantages. For example, in some cases, the time needed to service a request for a buffer may exceed the limited time that is available. In the case of a video system, there may be limited time available at the end of a video frame for the reader or the writer to obtain a new buffer. In addition, the data structures used by the electronic system for buffer management during operation may consume significant storage space within data caches, which may hinder efficient processor operation.

In other cases, branch misprediction on the host computer system may lead to reduced processor performance while implementing buffer management functions. In still other cases, where buffers are dynamically managed during operation of the electronic system, the buffer management behavior must be verified and/or debugged by observing the buffer management system in operation prior to deployment. The verification and/or debugging may be time consuming. Further, in cases where one buffer requester is implemented in hardware and another buffer requester is implemented in software, additional workarounds may be needed to prevent race conditions.

SUMMARY

A method can include receiving, using a processor, a user input specifying a reader policy and a number of a plurality of buffers used by a reader and a writer of a multi-buffer electronic system. The method can include generating, using the processor, a state machine as a data structure. The state machine has a plurality of states determined based on the number of the plurality of buffers and the reader policy. The state machine allocates different buffers of the plurality of buffers to the reader in temporally accurate order over time. In addition, each state specifies an allocation from the plurality of buffers to the reader and the writer. The method also can include generating, using the processor, a state machine description including one or more program code components for use in an implementation of the reader and an implementation of the writer.

A system can include a processor configured to initiate operations. The operations can include receiving a user input specifying a reader policy and a number of a plurality of buffers used by a reader and a writer of a multi-buffer electronic system. The operations can include generating a state machine as a data structure. The state machine has a plurality of states determined based on the number of the plurality of buffers and the reader policy. The state machine allocates different buffers of the plurality of buffers to the reader in temporally accurate order over time. In addition, each state specifies an allocation from the plurality of buffers to the reader and the writer. The operations also can include generating a state machine description including one or more program code components for use in an implementation of the reader and an implementation of the writer.

A computer program product includes one or more computer readable storage media, and program instructions collectively stored on the one or more computer readable storage media. The program instructions are executable by computer hardware to initiate operations. The operations can include receiving a user input specifying a reader policy and a number of a plurality of buffers used by a reader and a writer of a multi-buffer electronic system. The operations can include generating a state machine as a data structure. The state machine has a plurality of states determined based on the number of the plurality of buffers and the reader policy. The state machine allocates different buffers of the plurality of buffers to the reader in temporally accurate order over time. In addition, each state specifies an allocation from the plurality of buffers to the reader and the writer. The operations also can include generating a state machine description including one or more program code components for use in an implementation of the reader and an implementation of the writer.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates example high-level programming language code generated for a writer.

FIG. 7 illustrates example high-level programming language code generated for a reader.

FIGS. 8A-8B illustrate example hardware description language code generated for a writer.

FIGS. 9A-9B illustrate example hardware description language code generated for a reader.

FIG. 10 illustrates an example of a hardware header file common to both reader and writer hardware description language generated as part of a programmatic description of a state machine.

DETAILED DESCRIPTION

Figure 1:
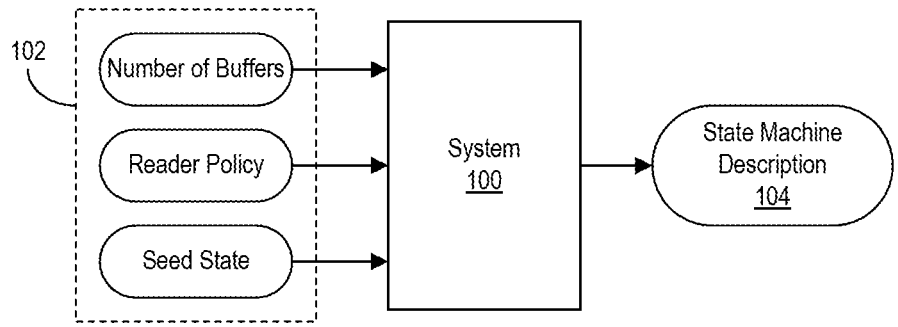
FIG. 1 illustrates an example system for automatically generating a state machine.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic systems and, more particularly, to automatically generating a state machine for an electronic system that uses multiple buffers. In accordance with the inventive arrangements described within this disclosure, a system is capable of automatically generating a state machine capable of managing a plurality of buffers of an electronic system. Within this disclosure, the electronic system having a plurality of buffers is also referred to as a "multi-buffer system." The state machine ensures that the buffers are provided to requesters such as readers and writers while preserving the temporal accuracy of the data within the multi-buffer system. As defined within this disclosure, the term "buffer" means a temporary memory area in which data is stored while the data is being processed or transferred.

In the example implementations, the system is capable of generating the state machine automatically based on one or more user inputs that supply a limited amount of information relating to the multi-buffer system. The system is capable of automatically generating a description of the state machine that includes one or more program code components.

In one aspect, the program code components may include one or more files specified in a high-level programming language (HLPL) that may be included in software-based implementations of the reader and/or writer. In another aspect, the program code components may include one or more files specified in a hardware description language (HDL) that may be included in hardware-based implementations of the reader and/or the writer. In other examples, the program code components may include files specified in both HLPL and HDL.

In accordance with the inventive arrangements described herein, the system is capable of generating the state machine as an offline process. Unlike buffer management techniques that dynamically determine the allocation of buffers to the reader and writer during operation of the multi-buffer system, by generating the state machine offline as described herein, the resulting state machine does not require run-time debugging on the target hardware.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100 for automatically generating a state machine. System 100 may be implemented as a computer or other data processing system programmed with suitable operational software to perform the operates described within this disclosure. An example of a computer that may be used to implement system 100 is described in connection with FIG. 11.

System 100 is configured to receive a user input 102 and automatically generate a state machine description 104 based on the information specified in user input 102. State machine description 104 may be used by a multi-buffer electronic system (multi-buffer system) to control access and allocation of buffers to reader(s) and writer(s) of the multi-buffer system.

The term "reader," as used within this disclosure, means circuitry of a multi-buffer system that reads data from a plurality of buffers of the multi-buffer system. In one aspect, the reader may be software-based in that the reader is implemented as a circuit such as a processor that executes program code. In another aspect, the reader may be hardware-based in that the reader is implemented as a circuit, e.g., that does not execute program code. The term "writer," as used within this disclosure, means circuitry of a multi-buffer system that writes data to a plurality of buffers of the multi-buffer system. In one aspect, the writer may be software-based in that the writer is implemented as a circuit such as a processor that executes program code. In another aspect, the writer may be hardware-based in that the writer is implemented as a circuit, e.g., that does not execute program code.

It should be appreciated that while the example implementations described within this disclosure are generally described as including one reader and one writer, the inventive arrangements described herein may be used with multi-buffer systems that include one or more readers and one or more writers.

In an example implementation, user input 102 specifies information including a number of buffers and a reader policy. The "number of buffers" may be an integer value specifying the number of buffers used by the reader and the writer in the multi-buffer system. The reader policy specifies how data is to be consumed by the reader. Accordingly, the reader policy dictates how buffers are allocated to the reader and to the writer. In one aspect, the reader policy may be implemented as a data structure specifying a set of rules that are executed by a system in generating a state machine for buffer management.

An example of a reader policy is "oldest available" where the reader is provided the buffer with the temporally oldest available data. The oldest available policy provides smoother readback of buffered data at the expense of increased latency. Another example of a reader policy is "newest available" where the reader is provided the buffer that contains the temporally newest available data. The newest available policy increases the chance that the reader will run out of buffers in cases where the writer operates more slowly, thereby causing the reader to repeat data usage from the buffer or wait for new data.

Still another example of a reader policy is "wait for new buffer." In the wait for new buffer policy, the reader does not accept a repeat buffer. That is, in the case where the reader is allocated a particular buffer for a current state, the reader does not accept allocation of that same buffer for a next state. In the wait for new buffer policy, the reader waits for a new buffer without making any further buffer requests.

Each of the example reader policies provides temporally accurate data to the reader. As defined within this disclosure, the term "temporally accurate" means that data generated over time is provided to the reader in a time-based order that moves forward in time. That is, the reader does not receive data that moves backward in time.

For purposes of illustration, consider a video processing system having multiple buffers. The buffers store frames of the video data. If the reader is allocated buffer 0 for a current state, the reader may be allocated buffer 1 for the next state. The data is temporally accurate if buffer 1 contains a frame of video that occurs later in time than the frame of video contained in buffer 0. In another example, the reader may be instructed to keep buffer 0 for a next state. In that case, the reader processes the same frame of video for the current state and for the next state. Still, the data provided to the reader is temporally accurate since the frame provided to the reader in the next state is not earlier in time than the frame provided to the reader in the current state. The term "temporally accurate" does not mean that data, e.g., a buffer, cannot be dropped or repeated. In this regard, frames of data may be dropped or repeated when providing data to the reader. Still, so long as frames of data provided to the reader do not go backward in time, the data is considered temporally accurate.

User input 102 optionally may specify a seed state. In cases where user input 102 specifies a seed state, the seed state is used by system 100 in generating state machine description 104. In one aspect, the seed state specifies a first of the plurality of buffers of the multi-buffer system that is allocated to the writer in the first or initial state of the state machine that is generated. The buffer is allocated to the writer for that first or initial state of the state machine without the writer first having to request a buffer. In cases where user input 102 does not specify a seed state, system 100 is capable of generating a state machine where the writer must first request a buffer before one is initially allocated thereto or may use a default buffer allocation to the writer for the first or initial state.

Figure 4:
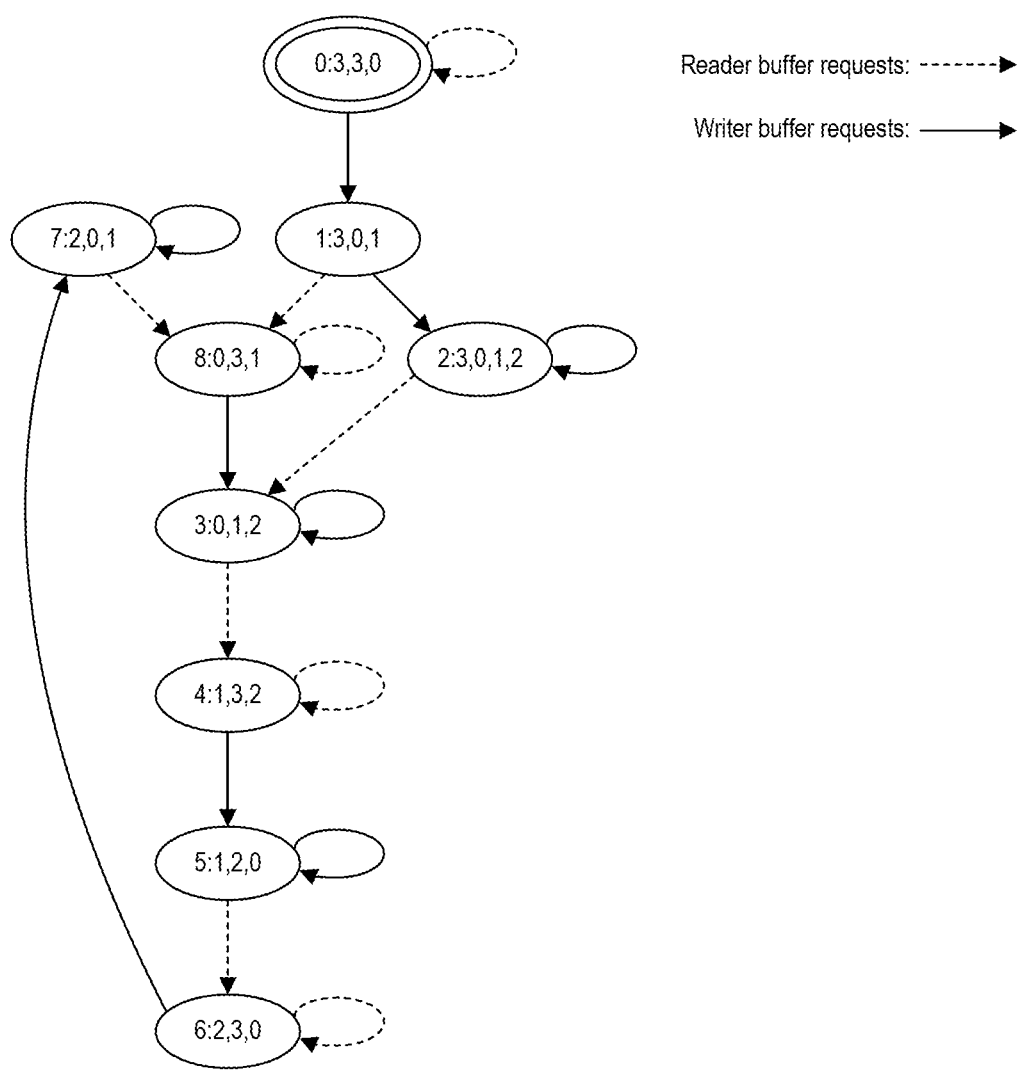
FIG. 4 illustrates an example of a data flow graph specifying a state machine as generated by the example system of FIG. 1.
Figure 5:
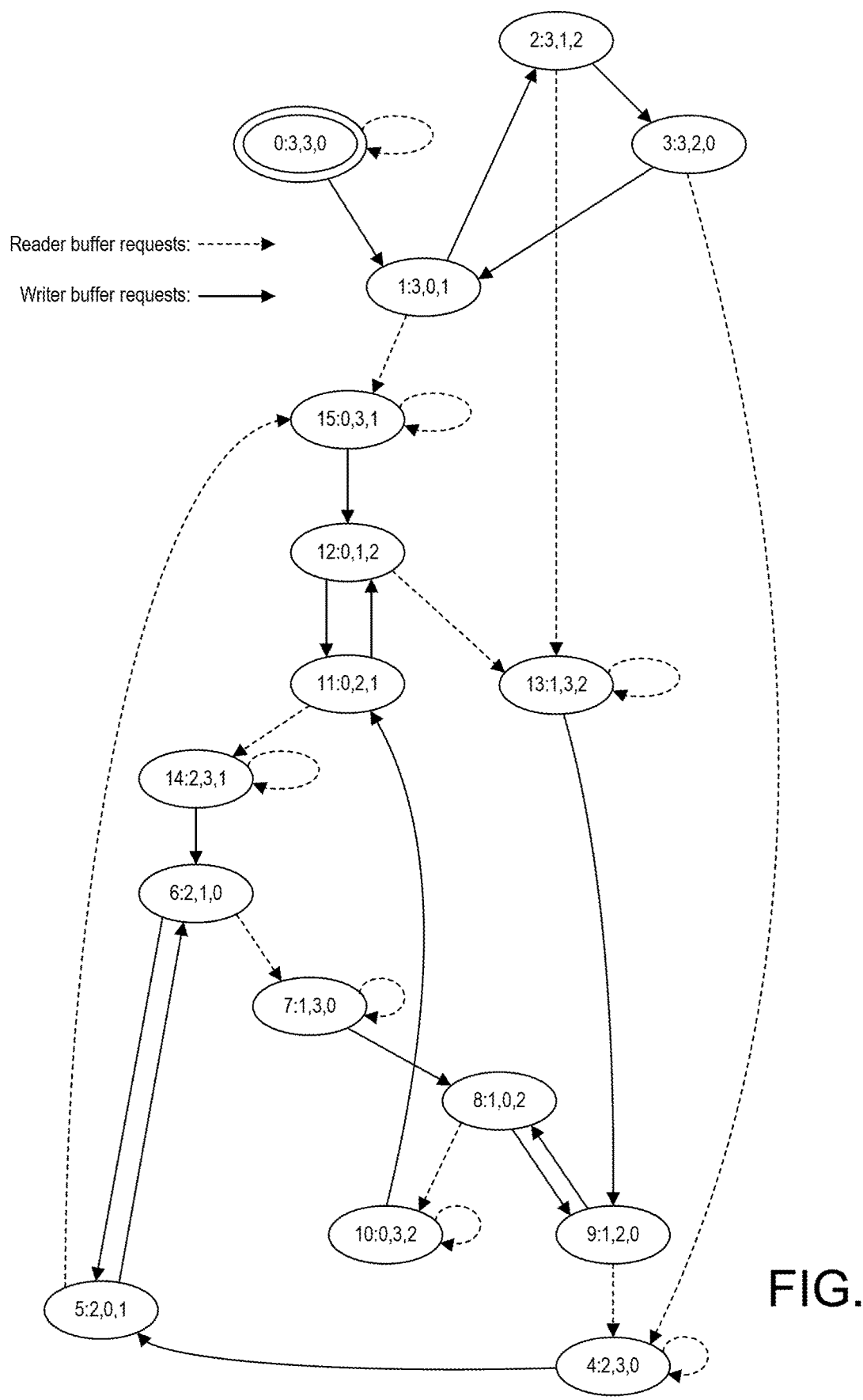
FIG. 5 illustrates another example of a data flow graph specifying a state machine as generated by the example system of FIG. 1.

In an example implementation, the system is capable of generating a state machine as a data flow graph specifying the states of the state machine and the connectivity of states. Examples of data flow graphs are provided in FIGS. 4 and 5. It should be appreciated, however, that the examples of FIGS. 4 and 5 are visualizations and that the data flow graphs may be specified as any of a variety of data structures including computer based or readable graph description languages and/or files.

System 100 is capable of generating a state machine description 104 based on user input 102. State machine description 104 may include a plurality of different program code components. In one aspect, the program code components may be used within software-based implementations of the reader and/or the writer. For example, the program code components may be source code files specified in an HLPL. The source code files may specify a compilable implementation of the state machine that may be used with, e.g., incorporated into, a software-based implementation of the reader and/or the writer. Examples of an HLPL include, but are not limited to, C and C++.

In another aspect, the program code components may be used within hardware-based implementations of the reader and/or the writer. For example, the program code components may be source code files specified in an HDL. The source code files may specify a synthesizable implementation of the state machine that may be used with, e.g., incorporated into, a hardware-based implementation of the reader and/or the writer. Examples of an HDL include, but are not limited to, VHDL and Verilog.

In another aspect, the system is capable of generating program code components for both hardware-based and software-based implementations of the reader and/or the writer. For example, a developer of the multi-buffer system may wrap the generated program code component(s) for a writer in an application-specific implementation of the writer, whether hardware that may be synthesized or software that is compiled for execution. Similarly, the developer may wrap the generated program code component(s) for a reader in an application-specific implementation of the reader, whether hardware that may be synthesized or software that may be compiled for execution.

Figure 2:
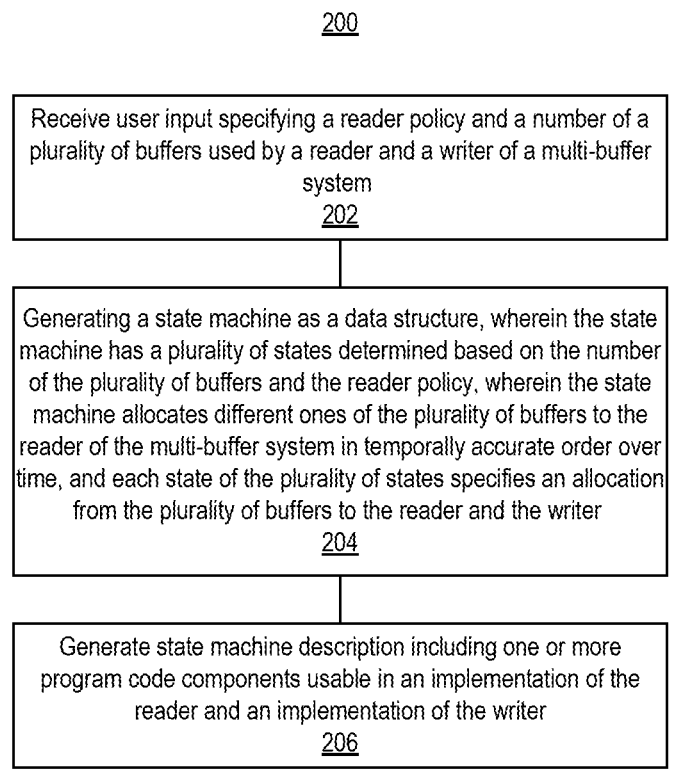
FIG. 2 illustrates an example method of automatically generating a state machine.

FIG. 2 illustrates an example method 200 of automatically generating a state machine. Method 200 may be performed by system 100 of FIG. 1. As noted, an example implementation of system 100 is described in connection with FIG. 11.

Method 200, as performed by the system, is an offline process in that the state machine is generated and subsequently incorporated into a reader and a writer of a multi-buffer system. As such, the determination of which buffer to be allocated to the reader and the writer of the multi-buffer system during operation of that system is predetermined by the various states of the state machine. The multi-buffer system does not dynamically determine an allocation of buffers to the reader and writer during operation of the system responsive to reader buffer requests or writer buffer requests through, for example, tracking the status of the various buffers included in the multi-buffer system.

In block 202, the system is capable of receiving a user input. The user input may specify a reader policy and a number of a plurality of buffers of the multi-buffer system that are to be used by the reader and the writer of the multi-buffer system. In block 204, the system is capable of generating a state machine as a data structure. The state machine includes a plurality of states that are determined based on the number of the plurality of buffers and the reader policy. The state machine allocates different buffers of the plurality of buffers to the reader of the multi-buffer system in temporally accurate order over time. Further, each state of the plurality of states specifies an allocation of buffers from the plurality of buffers to the reader and the writer. Each state of the plurality of states of the state machine may be unique. In block 206, the system is capable of generating a state machine description. The state machine description includes one or more program code components. As discussed, the program code component(s) are usable in an implementation of the reader and an implementation of the writer.

Figure 3:
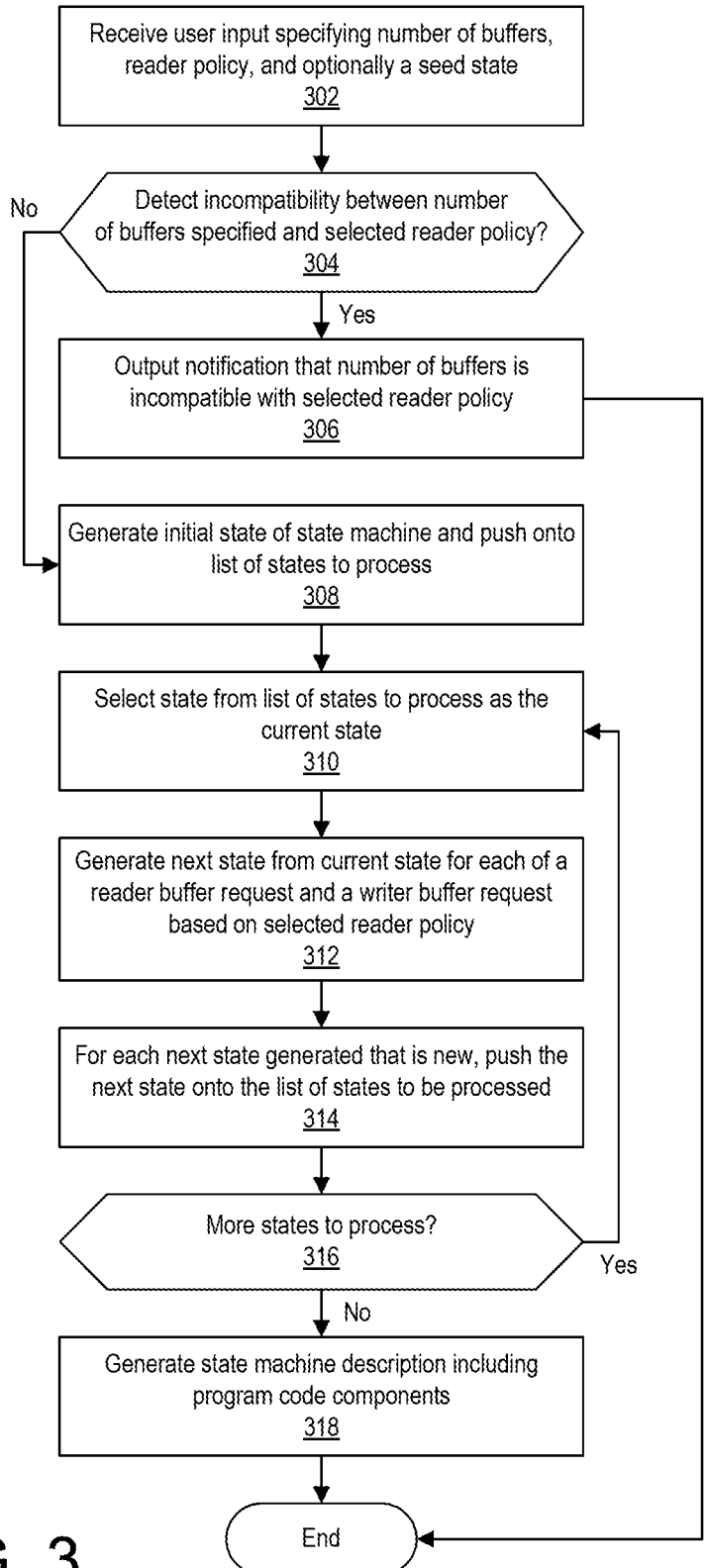
FIG. 3 illustrates another example method of automatically generating a state machine.

FIG. 3 illustrates an example method 300 of automatically generating a state machine. Method 300 may be performed by system 100. As noted, an example implementation of system 100 is described in connection with FIG. 11. Method 300, as performed by the system, is an offline process in that the state machine is generated and subsequently incorporated into a reader and a writer of a multi-buffer system as previously described.

For purposes of illustration, method 300 is described with reference to FIGS. 4 and 5. FIGS. 4 and 5 each illustrate an example of a data flow graph specifying a state machine as generated by the example system of FIG. 1. In an example implementation, the system is capable of simulating operation of the multi-buffer system to create the state machine. Each state of the state machine, at least as being generated, may be stored as a string of comma-separated buffer numbers. A special or selected number referred to as a "no buffer" indicator may be used to denote the case where a buffer is not allocated, is unfilled, or is unusable.

Referring to the examples of FIGS. 4 and 5, states of the state machine are specified in the following format [read buffer, available buffer(s), write buffer]. In FIGS. 4 and 5, this format is prepended with a state number for ease of reference. In the example format, buffer numbers are used in the locations or slots shown. In the example format, for each state, the leftmost slot specifies the number of the buffer currently allocated to the reader, the rightmost slot specifies the number of the buffer currently allocated to the writer, and the middle slot(s) specify the number of the buffer(s) that are available for use by the reader. When either the reader or the writer requests a buffer, that entity implicitly gives up the buffer currently allocated to the requesting entity, if any.

For example, in a multi-buffer system with 3 buffers numbered 0, 1, and 2, an example state is [1, 0, 2]. In the example state [1, 0, 2], buffer 1 is allocated to the reader and is referred to as the read buffer; buffer 0 is available and is referred to as the available buffer; and buffer 2 is allocated to the writer and is referred to as the writer buffer. In cases where a buffer is not allocated, a "no buffer" indicator may be used in the appropriate slot or slots of the state. For purposes of illustration, the "no buffer" indicator may be a number that does not correspond to an actual buffer. In this example, the number 3 may be used as a "no buffer" indicator. For example, in the state [3, 0, 1], no buffer is allocated to the reader; buffer 0 is available; and buffer 1 is the writer buffer.

For purposes of illustration, the number of buffers used in the examples of FIGS. 3, 4, and 5 is 3. It should be appreciated that the inventive arrangements are not intended to be limited by the number of buffers used. The inventive arrangements, for example, are operable when more than three buffers are specified. FIG. 4 illustrates an example where the oldest available reader policy is used. FIG. 5 illustrates an example where the newest available reader policy is used. Within FIGS. 4 and 5, reader buffer requests are shown with dashed lines. Writer buffer requests are shown with solid lines. For purposes of illustration, the states, while being uniquely identified by the formatting described, are also numbered.

In block 302, the system is capable of receiving a user input. The user input may specify a reader policy and a number of a plurality of buffers of a multi-buffer system that are to be used by a reader and a writer of the multi-buffer system. The user input may also specify a seed state.

In block 304, the system is capable of detecting an incompatibility between the number of buffers specified by the user input and the user selected reader policy. In the case where a newest available policy is selected, no more than 3 buffers are necessary for implementation of the multi-buffer system since the reader is not provided with older buffers of data. Accordingly, in block 304, the system is capable of detecting an incompatibility in response to determining that the user specified number of buffers is greater than 3 and that the user specified reader policy is newest available.

In response to detecting the incompatibility, method 300 continues to block 306 where the system outputs a notification indicating that the number of buffers is incompatible with the newest available policy. The notification may be presented via a graphical user interface, as an audio message, or via another type of computer-generated user interface. In one aspect, after block 306, method 300 may end. In that case, the user may start the process anew using a different number of buffers and/or a different reader policy. In another aspect, the system may query the user whether the user would like to modify the number of buffers specified and/or modify the reader policy. In response to receiving user input specifying a number of buffers and/or a reader policy that are compatible, method 300 may continue to block 308.

In response to determining that there is no incompatibility between the number of buffers and the reader policy, e.g., no incompatibility is detected, method 300 continues to block 308. In block 308, the system generates an initial state of the state machine. The system, for example, defines the initial state as one in which all of the buffers are initially free. In the case where the user specifies a seed state, the specified buffer is allocated to the writer.

The examples of FIGS. 4 and 5 illustrate cases where the user specified a seed state. The initial or first state of the state machine in each of FIGS. 4 and 5 is illustrated with a double lined oval. In each of FIGS. 4 and 5, the initial state is [3, 3, 0], where no buffer is allocated to the reader, no buffer is available, and buffer 0 is the writer buffer.

In general, each buffer may have 1 of 4 buffer states (to be differentiated from states of the state machine) during operation of the multi-buffer system. These possible buffer states include free, allocated to a writer, allocated to a reader, and available. Within this disclosure, a buffer that is designated as a reader/writer buffer, is considered to be "allocated" to the read/writer as the case may be.

A buffer is considered free when any data that is stored in the buffer is from a previous write and is stale and unusable. A buffer is also considered free when the buffer has never been used for reading and/or writing such as when the system is initialized. An example of a free buffer is a buffer that has been consumed or read by the reader. Such a buffer may be designated as a free buffer for a subsequent or next state of the state machine. A buffer is "allocated to a writer" or is a "writer buffer" when assigned to the writer for use for a given state of the state machine. There may be exactly one buffer in the "allocated to writer" buffer state in the multi-buffer system at any given time. A buffer is "allocated to a reader" or is a "reader buffer" when assigned to the reader for a given state of the state machine. There may be exactly one buffer in the "allocated to reader" buffer state in the multi-buffer system at any given time. An available buffer is a buffer that has data for use by the reader.

In block 310, the system selects a state from the list of states to be processed as the current state. In selecting a state from the list of states, the system effectively removes the state from the list of states to be processed.

In block 312, the system generates a next state from the current state for each of a reader buffer request and a writer buffer request based on the selected reader policy. A reader buffer request is a request for a buffer from the reader. A writer buffer request is a request for a buffer from the writer. In one aspect, for each state that has not yet been analyzed, e.g., each state on the list of states to be processed, the system is capable of simulating a reader buffer request and a writer buffer request. The resulting state (e.g., the next state) in each simulation case may be stored.

For a reader buffer request using either the newest available policy or the oldest available policy, the system is capable of generating, from a current state, a next state of the state machine by, in response to determining that one or more of the plurality of buffers are waiting buffers for the current state, allocating a temporally earliest of the one or more waiting buffers to the reader for the next state and designating a reader buffer for the current state as a free buffer for the next state.

In general, in generating the next state from the current state for each of a reader buffer request and a writer buffer request, the system may include one or more programmatic rules. These rules may be embodied in a data structure accessible by the system. Example implementations of the rules may include, but are not limited to, a database, a text file, a markdown file, a script, or as executable program code. An example of a scripting language is Perl. The rules further embody the particular reader policy that is selected.

Continuing with the reader buffer request example using the newest available policy or the oldest available policy, the system is capable of generating the next state by following the rules described below.

If there are one or more waiting buffers for the current state, assign the temporally earliest of the one or more waiting buffers to the reader for the next state. In addition, designate the reader buffer for the current state, if one is allocated to the reader, as free for the next state. See, e.g., state 3 to state 4 in FIG. 4, and state 11 to state 14 in FIG. 5.

If there are no waiting buffers for the current state, e.g., the current state includes only no buffer indicators in the waiting state or middle slots, the next state is the same as the current state. That is, the state machine loops back to the current state as the next state. See, e.g., state 8 in FIG. 4, and state 15 in FIG. 5.

For a writer buffer request using the newest available policy, the system is capable of generating, from a current state, a next state of the state machine by, designating a writer buffer for the current state as a waiting buffer for the next state. In generating states of the state machine in cases where the newest available policy is used, each state of the state machine includes at most one waiting buffer. For example, in cases where the newest available policy is used, the multi-buffer system maintains 0 or at most 1 waiting buffer at any given time during operation. As noted, since the newest available policy uses exactly 3 buffers, at most 1 buffer is designated as a waiting buffer. In example implementations where the oldest available policy is used, there may be may use more than 3 buffers in the multi-buffer system. In such cases, the multi-buffer system may maintain 0, 1, or more than 1 waiting buffer at any given time during operation depending on the number of buffers being used.

Continuing with the writer buffer request using the newest available policy, the system is capable of determining whether a free buffer exists for the current state. In response to determining that a free buffer exists for the current state, the system is capable of designating the free buffer for the current state as the writer buffer for the next state. Alternatively, in response to determining that no free buffer exists for the current state, the system is capable of designating the waiting buffer for the current state as the writer buffer for the next state.

In the example of a writer buffer request using the newest available policy, the system is capable of generating the next state by following the rules described below.

Designate the writer buffer for current state as a waiting buffer for the next state. See, e.g., state 3 to state 1 in FIG. 5.

If a buffer is free for the current state, designate the free buffer as the writer buffer for the next state. See, e.g., state 3 to state 1 in FIG. 5.

If there is no free buffer for the current state, designate the waiting buffer for the current state as the writer buffer for the next state. See, e.g., state 12 to state 11 in FIG. 5.

For a writer buffer request using the oldest available policy, the system is capable of generating, from a current state, a next state of the state machine by, determining whether a free buffer exists for the current state. In response to determining that a free buffer exists for the current state, the system is capable of adding the writer buffer for the current state as a waiting buffer for the next state. In the case of the oldest available policy, each state includes 0 to at most N−1 waiting buffers, where N is the number of the plurality of buffers in the multi-buffer system. Further, the system is capable of designating the free buffer for the current state as the writer buffer for the next state.

In response to determining that a free buffer does not exist for the current state, the system is capable of keeping the writer buffer for the current state as the writer buffer for the next state. In that case, the system effectively loops to the same state. That is, the system determines that the current state is used as the next state.

In the example of a writer buffer request using the oldest available policy, the system is capable of generating the next state by following the rules described below.

If a buffer for the current state is free, add the writer buffer for the current state as a waiting buffer for the next state; and, designate the free buffer as the writer buffer for the next state. See, e.g., state 8 to state 3, and state 1 to state 2 in FIG. 4.

If there is no free buffer for the current state, keep the writer buffer for the current state as the writer buffer for the next state. See, e.g., state 3 in FIG. 4.

In the example shown in Table 1 below and in FIGS. 4 and 5, states are illustrated as an ordered list of buffer numbers. As noted, the leftmost number is the buffer assigned to the reader, while the rightmost number is the buffer assigned to the writer. The rest of the buffers comprise the "middle" buffers corresponding to available buffers. Buffer numbers that are not in an ordered list for a state are implicitly in the free buffer state. Middle buffers can be used to satisfy future reader requests. Middle buffers may also be assigned to the writer if there is no free buffer. Buffers "flow" from right to left on each successful allocation request. Buffer numbers range from 0 through (N−1), inclusive. In some situations, the "no buffer" case needs to be represented as a number. The value of "N" is used for purposes of illustration.

Table 1 illustrates further example operations performed by the system in generating states of the state machine. In the example of Table 1, N=3.

TABLE 1

| Ordered list | Reader buffer | Middle buffer(s) (Available Buffers) | Writer buffer |
|---|---|---|---|
| [3, 0, 1]<br>The Current state.<br>Buffer 2 is free. | 3 | 0<br>Buffer 0 was previously written and waiting to be read. | 1 |
| [3, 0, 1, 2]<br>The state after a writer buffer request using the oldest available reader policy. | 3 | 0, 1.<br>The next reader buffer request will get buffer 0 to preserve temporal accuracy. If the writer is slow and a second reader buffer request comes in, the reader buffer request will get buffer 1. | 2 |
| [3, 1, 2]<br>The state after a writer buffer request using the newest available policy. | 3 | 1.<br>Buffer 0 was discarded and is now free since buffer 0 is not the newest buffer available. | 2 |
| [0, 3, 1]<br>The state after a reader buffer request. | 0 | 3<br>No buffer is assigned to the middle. | 1 |

In block 314, for each of the next states generated in block 312 that is new, the system stores the next state on the list of states to be processed. As part of block 314, any states that are not new, e.g., states that are determined to be duplicates of prior generated states, are not added to the list of states to be processed. For example, in cases where the next state is the current state (e.g., a loop condition), the system does not add the state to the list of states to be processed.

It should be appreciated that as each state is removed from the list of states to be processed, the system builds the state machine as a data structure by storing the state and the connectivity of the states with respect to other generated states of the state machine to build a directed graph as a data structure representing the state machine. The system may determine whether any next states that are generated are new for purposes of adding such next states to the list of states to be processed by comparing the newly generated next states to existing nodes of the directed graph as the directed graph is built.

In block 316, the system determines whether there are any further states to be processed. Method 300 will eventually terminate as the number of possible buffer configurations is finite. In response to determining that the list of states to be processed includes one or more states, method 300 loops back to block 310 to select a state from the list for processing. In response to determining that the list of states to be processed does not include any further states, method 300 continues to block 318. Once the list of states to be processed is empty, the directed graph specifying the state machine is complete.

In block 318, the system is capable of generating a state machine description that includes program code components. The program code components specify various aspects of the state machine. The program code components may be used by, or incorporated into, reader and writer implementations.

In one aspect, the program code components may include a file specifying the directed graph as illustrated in each of FIGS. 4 and 5 in a particular file format. In the examples of FIGS. 4 and 5, each node represents one state of the buffers. Every node has two directed edges leading away from the node where one represents a reader buffer request and the other represents a writer buffer request when the multi-buffer system is in that state.

In one or more example implementations, the directed graph can be operated as a state machine at runtime by the multi-buffer system. The input to the directed graph, for example, may be the current (numeric) state number, and the type of transaction, where the type of transaction is a read corresponding to a reader buffer request or a write corresponding to a writer buffer request. The output is the next state which includes the allocated buffer value for the transaction.

In one or more example implementations, the state machine may be implemented using one or more Look Up Table (LUT) circuit blocks where the index contains one read/write bit and the current state, and the retrieved data include the next state and the buffer allocated for the transaction. In such an implementation, e.g., a hardware implementation, there are 2 entries per node in the directed graph where each entry corresponds to an edge exiting the node of the directed graph. The width of the LUT in bits is ceil(log 2(2*NumStates))+ceil(log 2(NumBuffers+1)), where NumStates is the number of states of the state machine and NumBuffers is the number of buffers to be managed. As understood by one skilled in the art, the "ceil" function returns the smallest integer value which is greater than or equal to a given number or the specified expression. The number of entries in the LUT will be ceil(log 2(2*NumStates)). For purposes of illustration, a state machine for a multi-buffer system with 7 buffers may have 13,699 states.

Using a state machine generated offline as described herein also allows the multi-buffer system to operate faster than would otherwise be the case since example implementations using the state machine generated as described herein are capable of operating, e.g., returning a buffer, in 1 clock cycle. This means that the multi-buffer system does not consume clock cycles by dynamically tracking buffers and making calculations to allocate a buffer to a particular requester in response to a request.

FIG. 6 illustrates an example program code component generated by the system of FIG. 1. FIG. 6 illustrates example HLPL program code generated by the system of FIG. 1 for a writer and output as a source code file. A developer may incorporate the HLPL program code into a software-based implementation of a writer of the multi-buffer system. In the example of FIG. 6, the HLPL is C.

FIG. 7 illustrates another example program code component generated by the system of FIG. 1. FIG. 7 illustrates example HLPL program code generated by the system of FIG. 1 for a reader and output as a source code file. A developer may incorporate the HLPL program code into a software-based implementation of a reader of the multi-buffer system. In the example of FIG. 7, the HLPL is C.

FIGS. 6 and 7 utilize switch statements in the HLPL implementations to provide improved runtime performance. Computer architectures typically utilize a data cache and an instruction cache. In conventional software-based implementations of state machines, the state machine is implemented as a lookup table that would be stored in the data cache. In a conventional software-based approach, execution of the HLPL code implementation of the state machine would analyze the lookup table and determine the next state. This operation would involve reading from the data cache, which is generally a slow operation requiring multiple clock cycles. In cases where the lookup table or portion thereof that is needed for the operation is not stored in the data cache, the processor must retrieve the needed lookup table or portion thereof from random access memory (RAM), which requires even more clock cycles. While the number of instructions to implement a conventional software-based state machine may be low, the size of the lookup table itself is large. As such, the likelihood that the entire lookup table will reside in or even fit in the data cache decreases, thereby increasing the likelihood of a data cache miss resulting in increased processing time.

The switch statement implementations of FIGS. 6 and 7 embody the state machine in the switch statements themselves. Being HLPL statements, the state machine is stored in the instruction cache of the software-based system as opposed to the data cache. Accordingly, in cases where the next state is to be determined for a reader or a writer, the function is invoked which causes the processor to automatically load the assembly instructions of the example of FIG. 6 or FIG. 7 into the instruction cache. Due to this automatic loading of the instruction and the next several instructions into the cache, the needed portion of the state machine implementation will be available in the instruction cache. As such, the reader or writer is provided with a buffer in fewer clock cycles compared to the conventional software-based approaches described herein.

The switch statement implementations illustrated in the examples of FIGS. 6 and 7 may also be efficiently processed by compilers using available compiler optimization techniques. As a result, branch predictions may be eliminated, thereby providing further performance improvements over conventional software-based state machine implementations.

FIGS. 8A and 8B illustrate another example program code component generated by the system of FIG. 1. FIGS. 8A and 8B illustrate example HDL program code generated by the system of FIG. 1 for a writer and output as a source code file. A developer may incorporate the HDL program code into a hardware-based implementation of a writer of the multi-buffer system. In the example of FIGS. 8A and 8B, the HDL is Verilog.

FIGS. 9A and 9B illustrate another example program code component generated by the system of FIG. 1. FIGS. 9A and 9B illustrate example HDL program code generated by the system of FIG. 1 for a reader and output as a source code file. A developer may incorporate the HDL program code into a hardware-based implementation of a reader of the multi-buffer system. In the example of FIGS. 9A and 9B, the HDL is Verilog.

FIG. 10 illustrates an example of a hardware header file common to both reader and writer hardware description language generated as part of a programmatic description of a state machine. The hardware header file of FIG. 10 may be generated by the system of FIG. 1. A developer may incorporate the hardware header file into a hardware-based implementation of a writer of a multi-buffer system as illustrated in FIGS. 8A and 9B and/or a reader of a multi-buffer system as illustrated in FIGS. 9A and 9B.

In one aspect, the common program code component of FIG. 10 may be used with an HDL implementation to inform the HDL implementation of the number of bits needed for the states. Further, the common program code component of FIG. 10 may be used with an HDL implementation to inform the HDL implementation that there is a bitmask available. Accordingly, the designer of the complete multi-buffer system does not need to make assumptions about the number of bits needed for a particular state machine implementation. The system is capable of defining and outputting the variables. As such, the designer may include the hardware header file within the HDL implementation without hard-coding any values. For example, each time that the system is run to generate a state machine, the common program code component may be output for a hardware implementation. The contents of the common program code component may change based on the user provided inputs to the system (e.g., number of buffers and/or reader policy), but utilize a same name so that the designer need not continually edit the reader and/or writer implementations each time the system is run to create a new or updated state machine.

In the example implementations described within this disclosure, program code components for the reader and the writer are generated. It should be appreciated, however, that the multi-buffer system designer is responsible for ensuring that only one of the reader or the writer is invoked at a time and that each is pointing to the same state at any given point in time.

Figure 11:
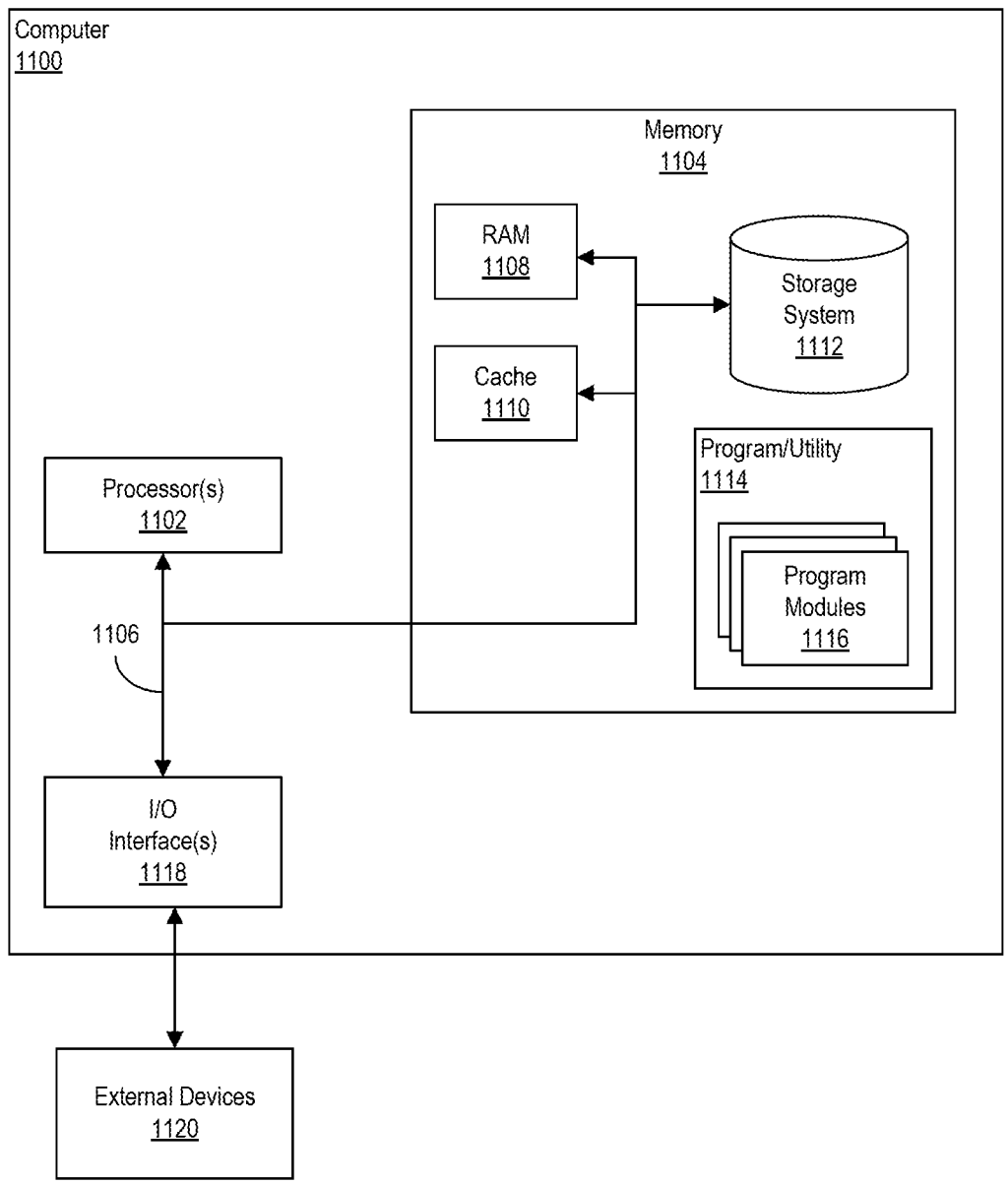
FIG. 11 illustrates an example computer for use with the inventive arrangements described within this disclosure.

FIG. 11 illustrates an example computer 1100 for use with the inventive arrangements described within this disclosure. Computer 1100 is an example implementation of system 100 of FIG. 1. Computer 1100 can include one or more processors 1102 (e.g., central processing units), a memory 1104, and a bus 1106 that couples various system components including memory 1104 to processor(s) 1102. Processor(s) 1102 may include any of a variety of processors that are capable of executing program code. Example processor types include, but are not limited to, processors having an x86 type of architecture (IA-32, IA-64, etc.), Power Architecture, ARM processors, and the like.

Bus 1106 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 1100 typically includes a variety of computer readable media. Such media may be any available media that is accessible by computer 1100 and may include any combination of volatile media, non-volatile media, removable media, and/or non-removable media.

Memory 1104 may include computer readable media in the form of volatile memory, such as RAM 1108 and/or cache memory 1110. Computer 1100 may also include other removable/non-removable, volatile/non-volatile computer system storage media. By way of example, storage system 1112 may be provided for reading from and writing to a non-removable, non-volatile magnetic media and/or solid-state drive (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 1106 by one or more data media interfaces. As will be further depicted and described below, memory 1104 may include at least one computer program product having a set (e.g., at least one) of program modules (e.g., program code) that are configured to carry out the functions and/or operations described within this disclosure.

For example, program/utility 1114, having a set (at least one) of program modules 1116 which may include, but are not limited to, an operating system, one or more application programs (e.g., user applications), other program modules, and/or program data, is stored in memory 1104. Program modules 1116 generally carry out the functions and/or methodologies as described herein at least with respect to operations performed by computer 1100. For example, program modules 1116 may implement a system capable of generating state machines as described herein and generating state machine descriptions having one or more program code components.

Program/utility 1114 is executable by processor(s) 1102. Program/utility 1114 and any data items used, generated, and/or operated upon by processor(s) 1102 are functional data structures that impart functionality when employed by processor(s) 1102. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 1100 may include one or more Input/Output (I/O) interfaces 1118 communicatively linked to bus 1106. In one aspect, I/O interface(s) 1118 may include hardware controllers that allow computer 1100 to communicate with external devices 1120 where external devices 1120 allow a user to interact with computer 1100. For example, in that case, external devices may include a keyboard, a mouse, and/or a display. In other cases, I/O interfaces 128 may include, but are not limited to, network cards, modems, network adapters, etc. that allow computer 1100 to communicate with one or more other systems.

FIG. 11 is not intended to suggest any limitation as to the scope of use or functionality of the examples described herein. Computer 1100 is an example of computer hardware (e.g., a system) that is capable of performing the various operations described within this disclosure. Computer 1100 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service. Other examples of cloud computing models are described in the National Institute of Standards and Technology (NIST) and, more particularly, the Information Technology Laboratory of NIST.

Computer 1100 may be operational with numerous other general-purpose or special-purpose computing system environments or configurations. Examples of computing systems, environments, and/or configurations that may be suitable for use with computer 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 12:
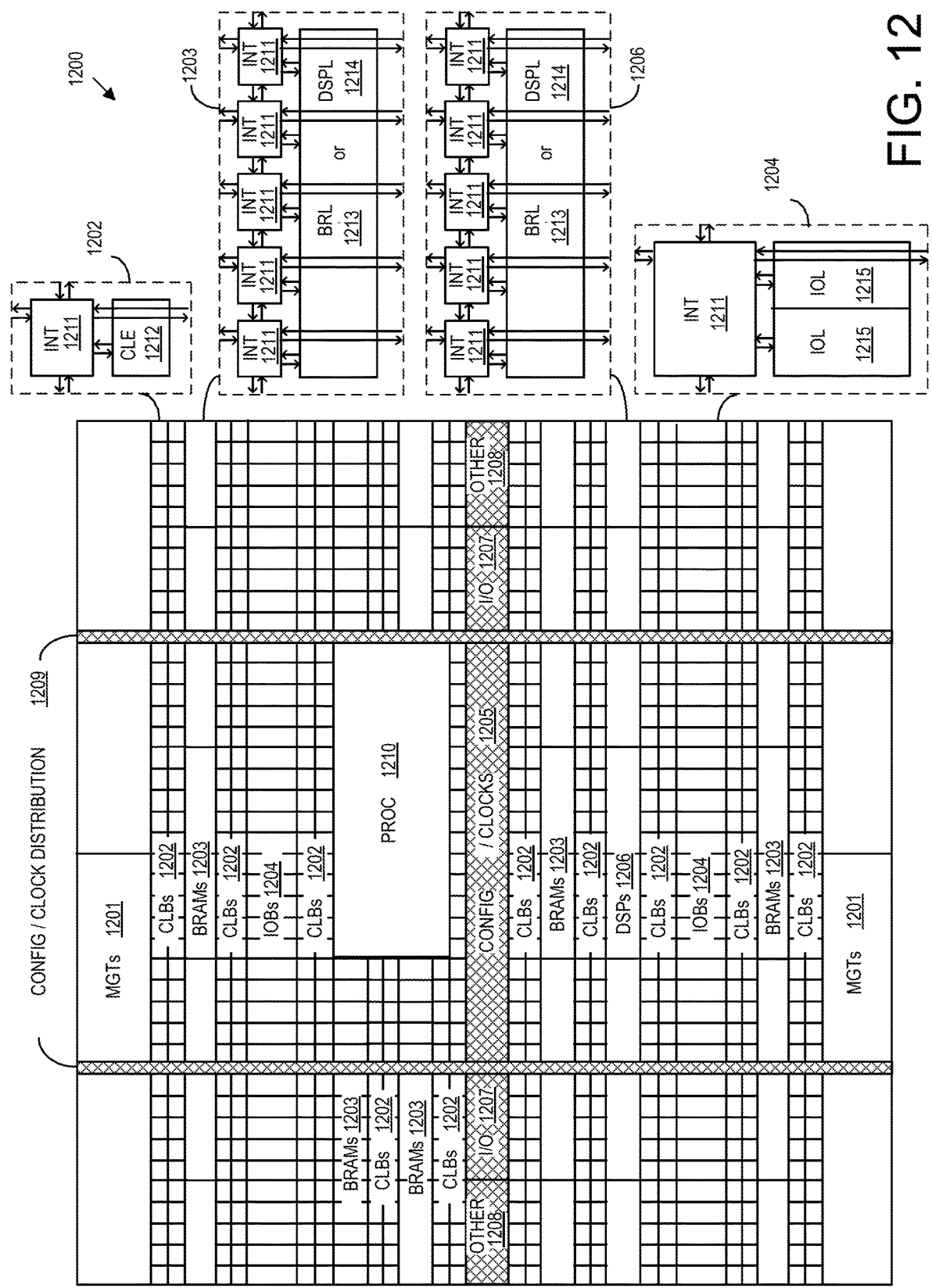
FIG. 12 illustrates an example architecture for an integrated circuit.

FIG. 12 illustrates an example architecture 1200 for an IC. In one aspect, architecture 1200 may be implemented within a programmable IC. For example, architecture 1200 may be used to implement a field programmable gate array (FPGA). Architecture 1200 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the right of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An 10B 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, a horizontal area near the center of the die, e.g., formed of regions 1205, 1207, and 1208, may be used for configuration, clock, and other control logic. Vertical areas 1209 extending from this horizontal area may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

As an illustrative and non-limiting example, an IC having an architecture the same as or similar to that of FIG. 12 may be used to implement a reader and/or a writer. The reader and/or writer may be implemented in programmable circuitry. It should be appreciated, however, that a reader and a writer may be implemented in other types of ICs that may or may not be programmable ICs. The reader and/or writer may be implemented as hardwired circuit blocks, for example, within a programmable IC or within other types of ICs that do not include programmable circuitry.

A computer as described herein in connection with FIG. 11 may be configured to perform operations such as synthesizing, placing, and routing a circuit design for a reader and/or a writer. The computer may also perform bitstream generation so that the bitstream may be loaded into the IC, thereby physically implementing the circuit design within the IC. In another aspect, such a computer may be configured to compile program code for a reader and/or a writer.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    receiving, using a processor, a user input specifying a reader policy and a number of a plurality of buffers used by a reader and a writer of a multi-buffer electronic system;
    generating, using the processor, a state machine data structure, wherein the state machine has a plurality of states determined based on the number of the plurality of buffers and the reader policy, wherein the state machine allocates different buffers of the plurality of buffers to the reader in temporally accurate order over time, and each state specifies an allocation from the plurality of buffers to the reader and the writer; and
    generating, using the processor, a state machine description including one or more program code components for use in an implementation of the reader and an implementation of the writer.

2. The method of claim 1, further comprising:
    in response to determining that the reader policy is a newest available policy and that the number of the plurality of buffers is greater than three, generating a notification indicating that the number of the plurality of buffers is incompatible with the newest available policy.

3. The method of claim 1, wherein the determining the state machine comprises:
    adding an initial state of the state machine to a list of states stored in a memory;
    for each state on the list of states:
        determining a first next state corresponding to a buffer request from the reader and adding the first next state to the list of states in response to determining that the first next state is new; and
        determining a second next state corresponding to a buffer request from the writer and adding the second next state to the list of states in response to determining that the second next state is new.

4. The method of claim 1, wherein the determining the state machine comprises:
    for a buffer request from the reader, generating, from a current state, a next state by, in response to determining that one or more of the plurality of buffers are waiting buffers in the current state, designating a temporally earliest of the one or more waiting buffers as a reading buffer for the next state and designating a reading buffer for the current state as a free buffer for the next state.

5. The method of claim 1, wherein the determining the state machine comprises:
    for a buffer request from the writer using a newest available policy, generating, from a current state, a next state by designating a writer buffer for the current state as a waiting buffer for the next state, and wherein each state includes at most one waiting buffer.

6. The method of claim 5, wherein the generating the next state comprises:
    in response to determining that a free buffer exists for the current state, designating the free buffer for the current state as a writer buffer for the next state; or
    in response to determining that no free buffer exists for the current state, designating a waiting buffer for the current state as the writer buffer for the next state.

7. The method of claim 1, wherein the determining the state machine comprises:
    for a buffer request from the writer using an oldest available policy, generating, from a current state, a next state by adding a writer buffer for the current state as a waiting buffer for the next state, and wherein each state includes at most N−1 waiting buffers where N is the number of the plurality of buffers.

8. The method of claim 7, wherein the generating the next state comprises:
    in response to determining that a free buffer exists for the current state, designating the free buffer as a writer buffer for the next state; or
    in response to determining that a free buffer does not exist for the current state, keeping the writer buffer for the current state as the writer buffer for the next state.

9. The method of claim 1, wherein the one or more program code components include one or more high-level programming language components or one or more hardware description language components.

10. The method of claim 9, wherein the one or more high-level programming language components are implemented using switch statements.

11. A system, comprising:
    a processor configured to initiate operations including:
    receiving a user input specifying a reader policy and a number of a plurality of buffers used by a reader and a writer of a multi-buffer electronic system;
    generating a state machine data structure, wherein the state machine has a plurality of states determined based on the number of the plurality of buffers and the reader policy, wherein the state machine allocates different buffers of the plurality of buffers to the reader in temporally accurate order over time, and each state specifies an allocation from the plurality of buffers to the reader and the writer; and
    generating a state machine description including one or more program code components for use in an implementation of the reader and an implementation of the writer.

12. The system of claim 11, wherein the processor is configured to initiate operations including:
  in response to determining that the reader policy is a newest available policy and that the number of the plurality of buffers is greater than three, generating a notification indicating that the number of the plurality of buffers is incompatible with the newest available policy.

13. The system of claim 11, wherein the determining the state machine comprises:
  adding an initial state of the state machine to a list of states stored in a memory;
  for each state on the list of states:
    determining a first next state corresponding to a buffer request from the reader and adding the first next state to the list of states in response to determining that the first next state is new; and
    determining a second next state corresponding to a buffer request from the writer and adding the second next state to the list of states in response to determining that the second next state is new.

14. The system of claim 11, wherein the determining the state machine comprises:
  for a buffer request from the reader, generating, from a current state, a next state by, in response to determining that one or more of the plurality of buffers are waiting buffers in the current state, designating a temporally earliest of the one or more waiting buffers as a reading buffer for the next state and designating a reading buffer for the current state as a free buffer for the next state.

15. The system of claim 11, wherein the determining the state machine comprises:
  for a buffer request from the writer using a newest available policy, generating, from a current state, a next state by designating a writer buffer for the current state as a waiting buffer for the next state, and wherein each state includes at most one waiting buffer.

16. The system of claim 15, wherein the generating the next state comprises:
  in response to determining that a free buffer exists for the current state, designating the free buffer for the current state as a writer buffer for the next state; or
  in response to determining that no free buffer exists for the current state, designating a waiting buffer for the current state as the writer buffer for the next state.

17. The system of claim 11, wherein the determining the state machine comprises:
  for a buffer request from the writer with an oldest available policy, generating, from a current state, a next state by, adding a writer buffer for the current state as a waiting buffer for the next state, and wherein each state includes at most N−1 waiting buffers where N is the number of the plurality of buffers.

18. The system of claim 17, wherein the generating the next state comprises:
  in response to determining that a free buffer exists for the current state, designating the free buffer as a writer buffer for the next state; or
  in response to determining that a free buffer does not exist for the current state, keeping the writer buffer for the current state as the writer buffer for the next state.

19. The system of claim 11, wherein the one or more program code components include one or more high-level programming language components or one or more hardware description language components; and
  wherein the one or more high-level programming language components are implemented using switch statements.

20. A computer program product, comprising:
  one or more computer readable storage media, and program instructions collectively stored on the one or more computer readable storage media, wherein the program instructions are executable by computer hardware to initiate operations including:
  receiving a user input specifying a reader policy and a number of a plurality of buffers used by a reader and a writer of a multi-buffer electronic system;
  generating a state machine data structure, wherein the state machine has a plurality of states determined based on the number of the plurality of buffers and the reader policy, wherein the state machine allocates different buffers of the plurality of buffers to the reader in temporally accurate order over time, and each state specifies an allocation from the plurality of buffers to the reader and the writer; and
  generating a state machine description including one or more program code components for use in an implementation of the reader and an implementation of the writer.

* * * * *